US012612989B2

(12) United States Patent
Cao

(10) Patent No.: US 12,612,989 B2
(45) Date of Patent: Apr. 28, 2026

(54) FEMALE CONNECTOR AND CONNECTOR ASSEMBLY COMPRISING THE SAME

(71) Applicant: Illinois Tool Works Inc., Glenview, IL (US)

(72) Inventor: Cong Cao, Shanghai (CN)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 19/015,333

(22) Filed: Jan. 9, 2025

(65) Prior Publication Data

US 2025/0230887 A1      Jul. 17, 2025

(30) Foreign Application Priority Data

Jan. 12, 2024    (CN) .......................... 202410054799.6

(51) Int. Cl.
F16L 37/107          (2006.01)
(52) U.S. Cl.
CPC .................................. F16L 37/107 (2013.01)
(58) Field of Classification Search
CPC ....... F16L 37/12; F16L 37/1225; F16L 37/14; F16L 37/142; F16L 37/144; F16L 37/148; F16L 37/0841; F16L 37/0844; F16L 37/088; F16L 37/0885; F16L 37/10; F16L 37/101
See application file for complete search history.

(56) References Cited

U.S. PATENT DOCUMENTS

| | | | |
|---|---|---|---|
| 7,695,024 B2 | 4/2010 | Ostergren |
| 11,326,728 B2 | 5/2022 | Ma |
| 11,480,277 B2 | 10/2022 | Trotter |
| 11,644,139 B2 | 5/2023 | Han |
| 12,123,529 B2 | 10/2024 | Güttinger |
| 2010/0025987 A1* | 2/2010 | Nagaya ................. F16L 37/144 |
| | | | 285/275 |

(Continued)

FOREIGN PATENT DOCUMENTS

| | | |
|---|---|---|
| DE | 102023108109 | 10/2024 |
| WO | 2016003686 | 1/2016 |

*Primary Examiner* — Aaron M Dunwoody

(74) *Attorney, Agent, or Firm* — McAndrews, Held & Malloy, Ltd.

(57) ABSTRACT

The present disclosure provides a female connector for receiving and being fixedly connected to a male connector having a retention groove, the female connector including a housing and a retention clip. The retention clip has a fixed portion and a movable portion, wherein the fixed portion is connected to the housing, and the movable portion is movable between a locked position and a released position along a surface of the housing. The retention clip is configured such that a retention flange can project into the channel and be located in a travel path of the male connector when the movable portion is in the locked position, and the retention flange exits the channel and is out of the travel path of the male connector when the movable portion is in the released position. The fixing portion of the retention clip of the present disclosure is connected to the housing, and thus the retention clip would not be detached from the housing even when an operator applies a large force. Also, the movable portion of the retention clip is movable in a circumferential direction of the housing such that the retention clip is elastically deformed.

19 Claims, 8 Drawing Sheets

D-D

(56)　　　　　　　References Cited

U.S. PATENT DOCUMENTS

| 2017/0356581 | A1 | 12/2017 | Trotter |
| 2024/0019060 | A1 | 1/2024 | Cao |
| 2024/0019061 | A1 | 1/2024 | Cao |
| 2024/0019063 | A1 | 1/2024 | Cao |
| 2024/0084897 | A1 | 3/2024 | Cao |
| 2024/0353040 | A1 | 10/2024 | Cao |

* cited by examiner

A-A

B-B

C-C

D-D

E-E

FEMALE CONNECTOR AND CONNECTOR ASSEMBLY COMPRISING THE SAME

RELATED APPLICATION

The present application claims the benefit of Chinese Patent Application No. 2024100547996, filed Jan. 12, 2024, titled "Female Connector and Connector Assembly Comprising the Same," the contents of which are hereby incorporated by reference.

TECHNICAL FIELD

The present disclosure relates to the technical field of connectors, and more particularly to a female connector of the quick-plug connector type and a connector assembly comprising the same.

BACKGROUND

A connector assembly of the quick-plug connector type typically includes a male connector and a female connector. The female connector is configured for receiving and being fixedly connected to the male connector provided with an annular retention groove on an outer surface thereof. The female connector typically includes a housing and a latch arranged on the housing. The latch can fit with the retention groove in the male connector to fixedly connect the male connector to the female connector, or release the male connector from the female connector.

SUMMARY

The present disclosure relates generally to a connector assembly, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1A:
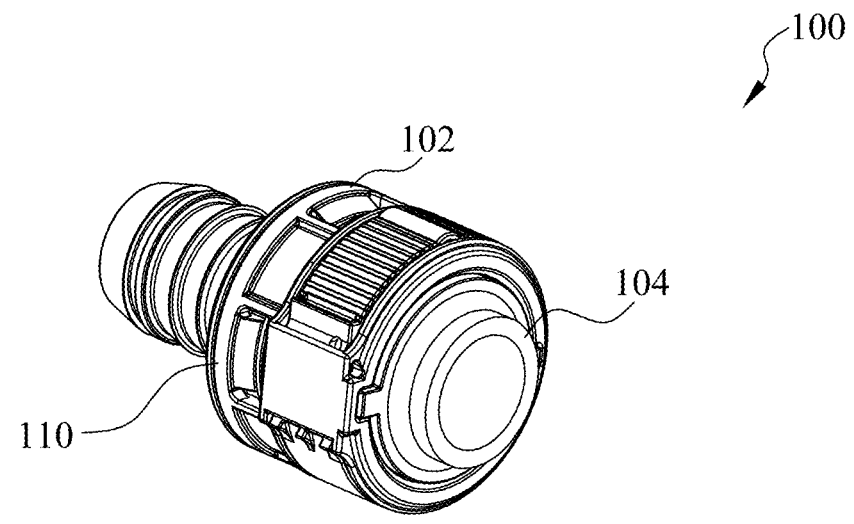
FIG. 1A is a structural perspective view of a connector assembly according to an embodiment of the present disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples, and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y"

means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y, and/or z" means "one or more of x, y, and z."

In a first aspect, the present disclosure provides a female connector for receiving and being fixedly connected to a male connector provided with a retention groove, the female connector including a housing and a retention clip. The housing is cylindrical and defines a channel extending in an axial direction therein, and the housing is configured to be capable of, through the channel, receiving and being fixedly connected to the male connector inserted in the axial direction of the housing, wherein at least one accommodating portion is circumferentially provided in the housing portion for receiving the male connector. The retention clip is sleeved on an outer side of the housing, at least one retention flange is provided on an inner wall of the retention clip, and the at least one retention flange fits with the at least one accommodating portion and at least partially projects into the channel through the accommodating portion to insert into the retention groove of the male connector, wherein the retention clip has a fixed portion and a movable portion, the fixed portion being connected to the housing, and the movable portion being movable between a locked position and a released position along a surface of the housing. The retention clip is configured such that a retention flange is capable of projecting into the channel and being located in a travel path of the male connector when the movable portion is in the locked position, and the retention flange exits the channel and is out of the travel path of the male connector when the movable portion is in the released position.

According to the first aspect described above, the retention clip is in the shape of a circular ring having an opening, and the retention clip has a first end and a second end formed at the opening. The first end forms the fixed portion, and the second end forms the movable portion.

According to the first aspect described above, the first end is rotatably connected to the housing, and the first end rotates relative to the housing when the second end moves from the locked position to the released position, wherein a rotation axis of the first end is parallel to an axis of the housing.

According to the first aspect described above, a slide groove extending in a circumferential direction is provided in the surface of the housing, a protrusion is provided on an inner wall of the second end, and the protrusion fits with the slide groove to limit a movement trajectory of the second end moving along the surface of the housing.

According to the first aspect described above, the slide groove has a stop surface at a tail end thereof, and the stop surface is configured to restrict the protrusion to the released position.

According to the first aspect described above, the retention clip further includes a deformable portion, and the first end and the second end are respectively connected to two ends of the deformable portion, wherein the deformable portion is configured to be deformable in order to at least partially leave from the outer surface of the housing as the second end moves from the locked position to the released position.

According to the first aspect described above, the deformable portion includes at least one arch portion arching outwardly, and the at least one arch portion is configured to deform more easily than the rest of the deformable portion, to assist in the movement of the second end from the locked position to the released position.

According to the first aspect described above, the housing includes a mount extending in a tangential direction of the housing, wherein the first end and the second end of the retention clip are respectively arranged on two opposite sides of the mount in a circumferential direction.

According to the first aspect described above, the housing includes an indication area on the outer surface thereof, and the indication area is configured to arrange an identifier; wherein the identifier in the indication area is exposed when the second end of the retention clip is in the locked position, and the identifier in the indication area is at least partially obscured by the retention clip when the second end is not in its locked position.

According to the first aspect described above, at least one operating portion is arranged on an outer wall of the second end, and the operating portion protrudes from the outer wall of the second end to facilitate applying a pushing force to the operating portion by an operator for pushing the second end to move along the outer surface of the housing.

According to the first aspect described above, the housing has a shaft hole. The first end is provided with a rotary shaft, and the first end is rotatably connected to the housing by means of the rotary shaft. An assembling portion is provided on an outer wall of the first end, and the assembling portion is configured to cooperate with an assembling tool to push the rotary shaft into the shaft hole.

According to the first aspect described above, the retention clip is made of a plastic material.

According to the first aspect described above, the at least one retention flange includes a plurality of retention flanges.

In a second aspect, the present disclosure provides a connector assembly, including: a male connector and a female connector. The male connector includes a retention groove recessed inwardly and extending in a circumferential direction. The female connector is described as in any one of the first aspects. The male connector is inserted into the female connector in an axial direction of the housing, and a retention flange projects into the retention groove of the male connector, such that the male connector and the female connector are connected fixedly relative to each other.

Other objectives and advantages of the present disclosure will be apparent from the following description of the present disclosure with reference to the drawings, which can contribute to a comprehensive understanding of the present disclosure.

Figure 1B:
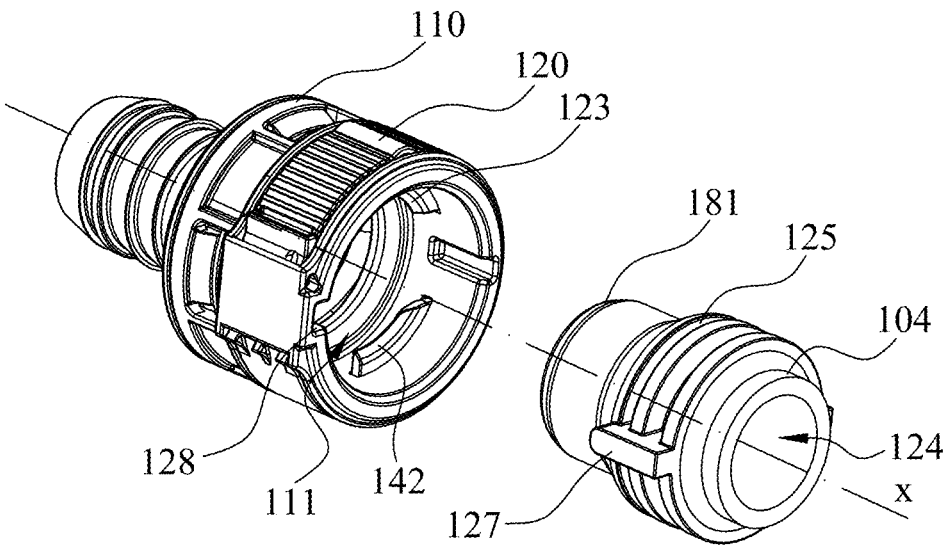
FIG. 1B is an exploded view of the connector assembly of FIG. 1A.

FIG. 1A is a perspective view of a connector assembly 100 which uses a female connector 102 according to an embodiment of the present disclosure, and FIG. 1B is a partial exploded view of the connector assembly 100 of FIG. 1A. In FIG. 1B, a male connector 104 is separated from the female connector 102. As shown in FIGS. 1A and 1B, the connector assembly 100 includes the male connector 104 and the female connector 102. The male connector 104 is fixedly connected to the female connector 102 by means of insertion, that is, the male connector 104 is partially inserted into the female connector 102 to achieve fluid communication between the male connector 104 and the female connector 102.

The male connector 104 is substantially in the shape of a straight cylinder with a circular cross-section and has an axis x, and a male connector channel 124 is provided within the male connector 104. The male connector channel 124 runs through the male connector 104. Thus, when the male connector 104 is inserted into the female connector 102, the male connector channel 124 can be in communication with the interior of the female connector 102. A retention groove 125 recessed inwardly is provided in an outer surface of the male connector 104, and the retention groove 125 is in the shape of a circular ring and is arranged around a periphery of the male connector 104. The retention groove 125 is configured to receive a retention flange 123 of a retention clip 120 of the female connector 102 to fixedly connect and lock the male connector 104 and the female connector 102 to each other. At least one boss 127 protruding outwardly is further provided on the outer surface of the male connector 104, and the boss 127 extends in an axial direction. The boss 127 is configured to fit with a groove 128 in an inner wall of the housing 110 of the female connector 102 to prevent the rotation of the male connector 104 in the female connector 102. In this embodiment, at least one boss 127 includes two bosses 127, and these two bosses 127 are oppositely arranged on two sides of the axis x.

An end of the male connector 104, which is configured to be inserted into the female connector 102, is provided with a guiding portion 181. The guiding portion 181 fits with a guided portion 142 on the retention clip 120 to jointly guide the male connector 104 to be inserted into the female connector 102 and to drive the retention clip 120 to move. In this embodiment, the guiding portion 181 and the guided portion 142 are inclined surfaces that fit with other. When the male connector 104 is inserted into the female connector 102 under a force, the guiding portion 181 and the guided portion 142 generate a component force on a contact surface, which force drives the retention clip 120 to move. In other embodiments, the guiding portion 181 and the guided portion 142 may also have other shapes and structures. Those skilled in the art can understand that, in the various embodiments of the present disclosure, it is mainly relied upon the push of an operator to deform the retention clip 120 to move the retention flange 123. Therefore, in some embodiments, it may be unnecessary to provide the guiding portion 181 and the guided portion 142.

The female connector 102 is substantially in the shape of a straight cylinder having a circular cross section and has a common axis x with the male connector 104. In order to adapt to different application environments, in other embodiments, the female connector 102 may also be in the shape of a bent tube or of a cylinder having another cross-sectional shape. The female connector 102 includes a housing 110. The shape and the size of the housing 110 at a proximal end for receiving the male connector 104 match with the shape and the size of the male connector 104, such that the male connector 104 can be just inserted into the female connector 102. In this embodiment, the housing 110 is provided with an external thread on a distal end thereof such that the female connector 102 can be in threaded connection with an external pipe (not shown) by means of the external thread. In other embodiments, the female connector 102 may also be connected with the external pipe in other ways, for example, by means of a clamp connection, etc.

The housing 110 defines a channel 111 running therethrough. The female connector 102 receives and fixes the male connector 104 through the channel 111. After the male connector 104 is inserted into the female connector 102, the male connector channel 124 is in communication with the channel 111 of the female connector housing 110, such that a pipe to which the male connector 104 is connected can be in fluid communication with the pipe to which the female connector 102 is connected. In this embodiment, the female connector 102 and the male connector 104 are substantially in the shape of coaxially arranged cylinders and have the common axis x. For ease of description, in the present disclosure, a direction in which the axis x extends is set as an axial direction, a direction about the axis x is set as a circumferential direction, and a direction perpendicular to the axis x is set as a radial direction. The male connector 104 is inserted into the channel 111 of the female connector 102 in the axial direction. Also, both the male connector channel 124 and the channel 111 extend in the axial direction. In some other embodiments, the male connector 104 and the female connector 102 may also have any other shapes, and may also be arranged non-coaxially. In addition, in the present disclosure, in the axial direction, a direction on the side where the male connector 104 is located is referred to as the front, and a direction on the side where the female connector 102 is located is referred to as the rear. The male connector 104 is inserted into the female connector 102 from front to rear.

Figure 2A:
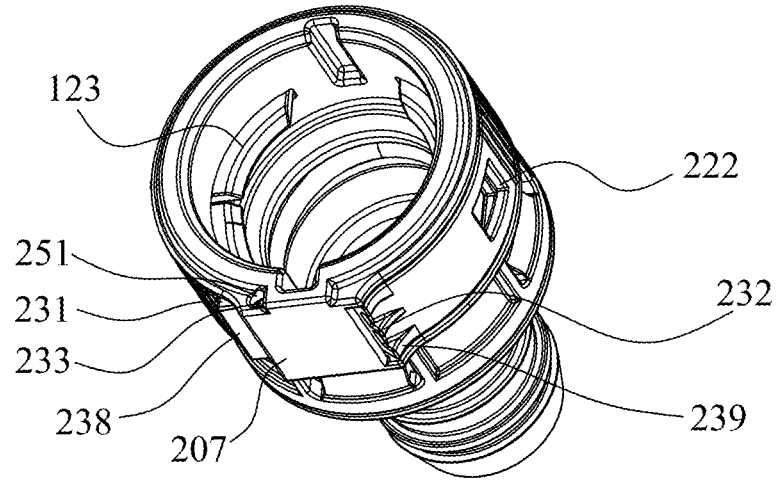
FIG. 2A is a structural perspective view of a female connector of FIG. 1A when a retention clip is in an initial state.
Figure 2B:
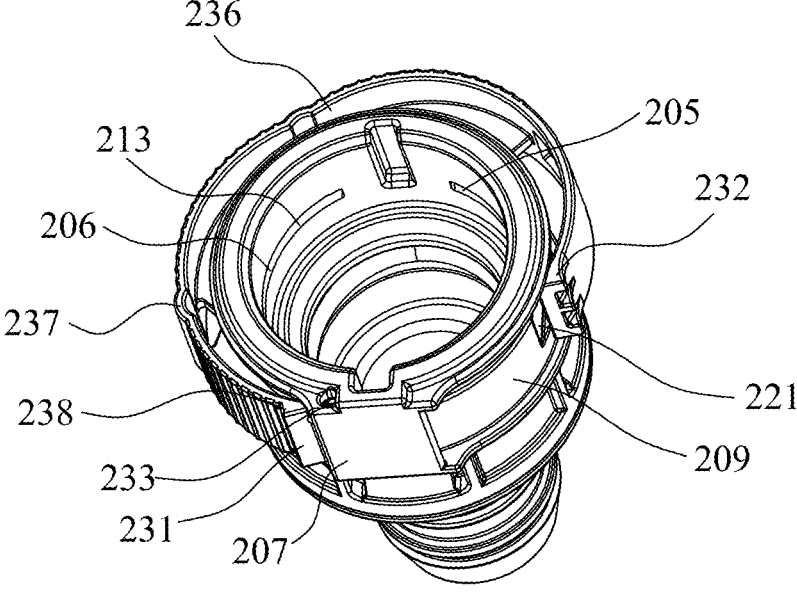
FIG. 2B is a structural perspective view of the female connector of FIG. 1A with a retention clip in a deformed state.

FIGS. 2A and 2B show a mating structure of the female connector 102 with the retention clip 120 when the retention clip 120 is in different states. FIGS. 2A and 2B respectively show structural perspective views of the female connector 102 when the retention clip 120 is in an initial state and the retention clip 120 is in a deformed state. As shown in FIGS. 2A and 2B, the female connector 102 includes a housing 110 and a retention clip 120, and the retention clip 120 is connected to the front of the housing 110, namely, a housing portion for receiving the male connector 104. In this embodiment, the retention clip 120 is made of a plastic material having a small thickness, such that the retention clip 120 can be elastically deformed to some extent and thus move relative to the housing 110 to reach different states. The retention clip 120 may implement different functions when the retention clip 120 moves to different states.

Specifically, the housing 110 includes at least one accommodating portion 213, and the at least one accommodating portion 213 is circumferentially arranged in the housing portion of the housing 110 that receives the male connector 104. The retention flange 123 of the retention clip 120 is formed by protruding radially from an inner wall of the retention clip 120 toward the channel 111. The accommodating portion 213 is configured to receive the retention flange 123 of the retention clip 120. In this embodiment, the accommodating portion 213 includes a long slot 206 arranged on the left side of the female connector 102 and a short slot 205 arranged on the right side of the female connector 102 (see further FIG. 3A). In this embodiment, the long slot 206 and the short slot 205 radially penetrate the housing 110.

The housing 110 further includes a mount 207, and the mount 207 is arranged at the front of the housing 110 and located in the circumferential direction of the housing 110. The mount 207 is configured to hold the retention clip 120 in place. The retention clip 120 is substantially in the shape of a circular ring having an opening 334 when in the initial state (see FIG. 3A), and the shape of the retention clip substantially matches with the shape of the outer surface of the housing 110, such that the retention clip 120 can be sleeved on and clamp an outer side of the housing 110. The retention clip 120 has a certain width in the axial direction, a smaller thickness in the radial direction, and a length in the circumferential direction that is approximate to but less than the circumference of the outer surface 209 of the housing 110, which affect a retention force of the retention clip 120. The retention clip 120 includes a fixed portion and a movable portion, and the fixed portion and the movable portion can deflect toward or away from each other. Also, the fixed portion is connected to the housing 110, and the movable portion is movable between a locked position and a released position along the surface of the housing 110. When the movable portion is in the locked position, the retention flange 123 projects into the channel 111. When the movable portion is in the released position, the retention flange 123 exits the channel 111. In some embodiments, the fixed portion is fixedly connected to the mount 207 of the housing 110. In some embodiment, the fixed portion may also be rotatably connected to the mount 207 of the housing 110.

Specifically, the retention clip 120 includes a first end 231, a second end 232 and a deformable portion 236. The first end 231 and the second end 232 are respectively connected to two ends of the deformable portion 236 to form the retention clip 120. In this embodiment, the first end 231 forms the fixed portion and is rotatably connected to the mount 207 of the housing 110. Also, the second end 232 forms the movable portion and is movable between the locked position and the released position along the surface of the housing 110. Moreover, the first end 231 and the second end 232 are arranged on two opposite sides of the mount 207 in the circumferential direction. From the perspectives as shown in FIGS. 2A and 2B, the first end 231 is rotatably connected to the left side of the mount 207 of the housing 110, and the second end 232 is arranged on the right side of the mount 207. Also, the second end 232 is movable between the locked position and the released position along the outer surface 209 of the housing 110. When the second end 232 is in the locked position, the second end 232 clamp the right side of the mount 207 of the housing 110. When the second end 232 is in the released position, the deformable portion 236 can be deformed elastically, and the deformable portion 236 at least partially leaves the outer surface 209 of the housing 110, so as to allow the second end 232 to deflect away from the first end 231 and thus to move to the released position.

In the embodiment as shown in the figures, when the retention clip 120 is in the initial state as shown in FIG. 2A, the second end 232 of the retention clip 120 is in the locked position, and the second end 232 is close to the first end 231. The retention clip 120 clamps the outer side of the outer surface 209 of the housing 110. The retention flange 123 of the retention clip 120 projects into the channel 111 through the accommodating portion 213 to lock the male connector 104 relative to the female connector 102 after the male connector 104 is in place, so as to maintain a fixed connection between the male connector and the female connector.

When the retention clip 120 is in the deformed state as shown in FIG. 2B, the second end 232 of the retention clip 120 moves to its released position, and the second end 232 moves away from the first end 231, such that the retention clip 120 at least partially leaves the outer surface of the housing 110. The retention flange 123 exits the channel 111 to make way for an insertion path of the male connector 104, such that the retention clip 120 does not affect the insertion or pullout of the male connector 104.

Those skilled in the art can understand that, in some embodiments, the fixed portion may also be arranged at a portion of the retention clip other than the end, as long as the movement of the movable portion along the housing can allow the retention flange to exit or enter the channel, by correspondingly arranging the structure of the retention flange.

More specifically, a shaft hole 251 is formed on the left side of the mount 207 of the housing 110, the first end 231 of the corresponding retention clip 120 has a rotary shaft 233, and the first end 231 is rotatably connected in the shaft hole 251 of the housing 110 by means of the rotary shaft 233. In this embodiment, the axes of the shaft hole 251 and the rotary shaft 233 are parallel to the axis of the housing 110. Thus, when the retention clip 120 is deformed, the first end 231 only rotates without leaving the outer surface 209 of the housing 110. Those skilled in the art can understand that, in order to prevent the rotary shaft 233 from falling out of the shaft hole 251 during rotation, the rotary shaft 233 and the shaft hole 251 typically need to be shaped such that assembling the rotary shaft 233 into the shaft hole 251 also correspondingly require a large insertion force. In this embodiment, an assembling portion 238 is further provided on an outer wall of the first end 231, and the assembling portion 238 protrudes from the outer wall of the first end 231. Also, the assembling portion 238 is configured to cooperate with an assembling tool to push the rotary shaft 233 into the shaft hole 251. The assembling portion 238 may have a shape matching with the assembling tool, as an example, the assembling portion 238 is in the shape of a platform, whose left side has a flat surface for matching with the assembling tool to facilitate applying a pushing force by the assembling tool from the flat surface to the first end 231. Those skilled in the art can understand that the shaft hole may also be formed in the first end 231 and the rotary shaft may be arranged on the housing 110, as long as the first end 231 is rotatably connected to the housing 110.

At least one operating portion 239 is provided on an outer wall of the second end 232 of the retention clip 120, and the operating portion 239 protrudes from the outer wall of the second end 232, in order to facilitate applying a pushing force by the operator on the operating portion 239 for pushing the second end 232 to move along the outer surface 209 of the housing 110. In this embodiment, the operating portion 239 is a triangular protrusion. Since both the assembling portion 238 and the operating portion 239 protrude from the outer wall of the retention clip 120, these portions have a larger thickness compared with the rest of the retention clip 120 and thus do not affect the deformation of the retention clip 120 and can bear a larger pushing force.

To facilitate the deformation of the deformable portion 236, the deformable portion 236 further includes at least one arch portion 237, and the at least one arch portion 237 is circumferentially arranged in the deformable portion 236. Each arch portion 237 arches outwardly such that the arch portion 237 deforms more easily than the rest of the deformable portion 236, and thus a deformation force required to deform the deformable portion 236 is reduced. In this embodiment, the number of at least one arch portion 237 is two.

Those skilled in the art can understand that the number of the arch portions 237, the width and thickness of the retention clip 120 and the length of the retention clip 120 in the circumferential direction all affect the deformability of the retention clip 120 and accordingly affect the retention force of the retention clip 120. A reduced deformability of the retention clip 120 represents a greater retention force of the retention clip 120, which means that a greater pushing force is needed to push the second end 232 to move. An increased deformability of the retention clip 120 represents a smaller retention force of the retention clip 120, which allows the male connector 104 to be easier to disengage from the female connector 102. Those skilled in the art may set the number of the arch portions 237, the width and thickness of the retention clip 120, the length of the retention clip 120 in the circumferential direction and so on, according to specific requirements.

The housing 110 is further provided with an indication area 221 on the outer surface 209 thereof, and the indication area 221 is configured to arrange an identifier. In some embodiments, the identifier may be an identification code, such as a two-dimensional code or a trademark. A window 222 is provided at a corresponding position on the retention clip 120. When the retention clip 120 is in the initial state, that is, the second end 232 is in the locked position, the window 222 can expose the entire identifier in the indication area 221. When the retention clip 120 is in the deformed state, that is, the second end 232 is not in the locked position, the identifier in the indication area 221 is at least partially obscured by the retention clip 120. During inserting the male connector 104 into the female connector 102, the operator can confirm whether the retention clip 120 deforms by determining whether the entire identification code is exposed, and then confirm whether the male connector 104 is mounted in place.

Figure 3A:
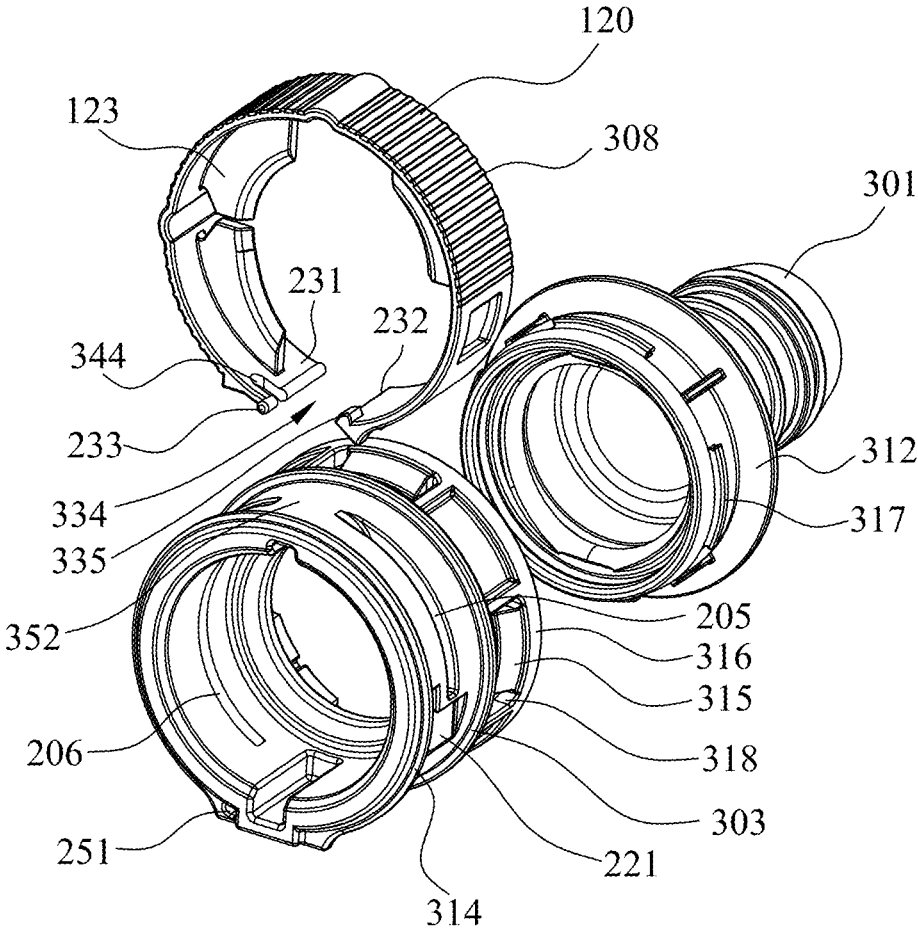
FIG. 3A is an exploded view of the female connector of FIG. 2A from one perspective.
Figure 3B:
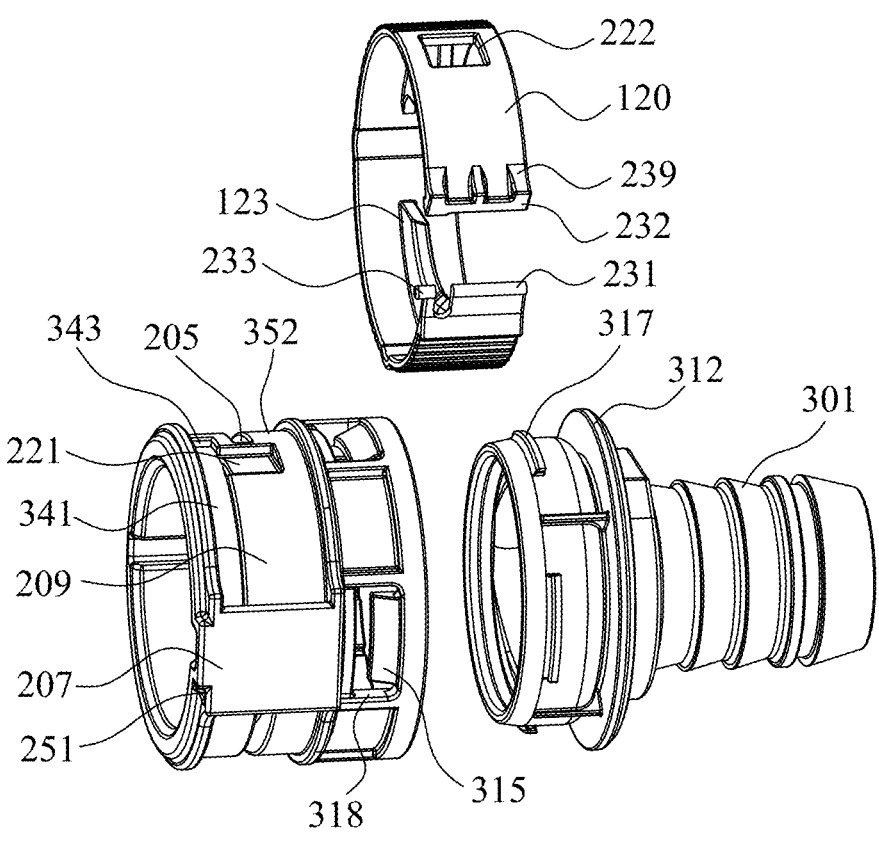
FIG. 3B is an exploded view of the female connector of FIG. 2A from another perspective.
Figure 3C:
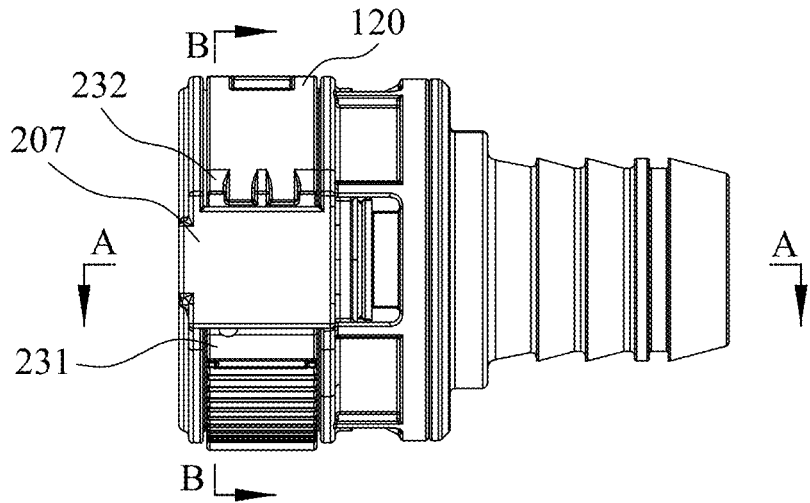
FIG. 3C is a bottom view of the female connector of FIG. 2A.

FIGS. 3A-3E further show a specific structure of the female connector 102. FIGS. 3A and 3B show exploded views of the female connector 102 from two perspectives, FIG. 3C shows a bottom view of the female connector 102 shown in FIG. 2A, and FIGS. 3D and 3E respectively show cross-sectional views of the female connector 102 along line A-A and line B-B. As shown in FIGS. 3A-3E, the housing 110 includes a body 301 and a connection seat 303. The connection seat 303 includes a retention clip connecting portion 314 located at the front of the connection seat 303 and a body connecting portion 316 located at the rear of the connection seat 303. The retention clip connecting portion 314 is configured to arrange the retention clip 120, and the body connecting portion 316 is configured to be connected to the body 301.

The retention clip connecting portion 314 is in the shape of a circular ring, the retention clip connecting portion 314 is provided with an inwardly recessed accommodating groove 352 in a circumferential surface thereof, and the accommodating groove 352 has a width and depth that match with the retention clip 120 to accommodate the retention clip 120. The bottom of the accommodating groove 352 forms the outer surface 209. The retention clip 120 is sleeved on and clamps an outer side of the retention clip connecting portion 314. The outer surface 209 is provided with a slide groove 341 extending in the axial direction, and the slide groove 341 is further recessed radially from the outer surface 209, but does not penetrate the housing 110. The indication area 221 is arranged on the rear side of a tail end of the slide groove 341. The short slot 205 of the accommodating portion 213 is located above the indication area 221, and the short slot 205 is arranged on the rear side of the slide groove 341 and staggered with the slide groove 341, such that the short slot 205 that penetrates the housing 110 does not affect the strength of the slide groove 341 that does not penetrate the housing 110. In this embodiment, the long slot 206 and the short slot 205 of the accommodating portion 213 are arranged oppositely and are aligned with each other in an axial direction, but the long slot 206 has a greater length than the short slot 205.

The first end 231 of the retention clip 120 further includes a notch 344, and the notch 344 is arranged at the rear side of the rotary shaft 233 and is recessed from the first end 231 in the circumferential direction. The notch 344 can provide a certain deformation space for the rotary shaft 233 to facilitate the assembly of the rotary shaft 233 into the shaft hole 251. In this embodiment, only one rotary shaft 233 is arranged at the front side of the first end 231. Compared with the arrangement of two rotary shafts at both the front side and the rear side of the first end 231, the arrangement of the only one rotary shaft 233 at the front side can also facilitate the assembly of the rotary shaft 233.

The second end 232 of the retention clip 120 further includes a protrusion 335. The protrusion 335 is arranged at the front side of the second end 232, and is formed by protruding upwardly from an inner wall of the second end 232. The protrusion 335 fits with the slide groove 341 and slides along the bottom of the slide groove 341 to limit a movement trajectory of the second end 232 moving along the outer surface 209 of the housing 110. In some embodiment, the slide groove 341 has a stop surface 343 at a tail end thereof, and the stop surface 343 is configured to restrict the protrusion 335 to the released position of the second end 232. Those skilled in the art can set the length of the slide groove 341 according to specific requirements. In some embodiment, the length of the slide groove 341 is set such that the entire retention flange 123 just exits the channel 111 when the stop surface 343 blocks the protrusion 335 of the second end 232.

The retention flange 123 of the retention clip 120 is arranged to be corresponding to the long slot 206 and the short slot 205 of the accommodating portion 213. Also, in order to arrange the arch portions 237 on the deformable portion 236 for reducing the deformation force of the deformable portion 236, the retention flange 123 is configured as three oppositely arranged projections, among which two projections are configured to pass through the long slot 206, and the other one projection is configured to pass through the short slot 205. Moreover, two arch portions 237 are each arranged on a corresponding deformable portion 236 between every two of the three projections. Thus, the retention flange 123 formed by these three projections does not impede the opened deformation of the retention clip 120.

The retention clip 120 of the present disclosure is in the shape of a circular ring having an opening 334 at the bottom, such that the first end 231 and the second end 232 are close to each other to enable the retention clip 120 to have a retention force for clamping the housing 110. When the second end 232 moves circumferentially along the outer surface 209 of the housing 110, the first end 231 only rotates without a movement relative to the housing 110, the second end 232 moves away from the first end 231, and the deformable portion 236 is deformed to open the retention clip 120. The retention flange 123 moves toward the outer side of the housing 110 to exit the accommodating portion 213.

A plurality of protruding ribs 308 are further provided on the outer wall of the retention clip 120 and protrude outwardly. These protruding ribs 308 can facilitate the positioning by the operator. For example, in environment where the line of sight is restricted, the operator may find the retention clip 120 by touching the protruding ribs 308.

The body connecting portion 316 of the housing 110 is provided with a plurality of windows 318 in a circumferential direction, and an elastic snap-fit fastener 315 is attached in each window 318. A rear end of each elastic snap-fit fastener 315 is connected to a rear wall of a corresponding window 318, and a front end of each elastic snap-fit fastener 315 is spaced from a front wall of the corresponding window 318 by a distance. The body 301 is correspondingly provided with a plurality of outwardly protruding lugs 317 in the circumferential direction, and the lugs 317 are configured to extend into the windows 318 and abut against the elastic snap-fit fasteners 315. When a rear end of the body connecting portion 316 abuts against the annular flange 312 of the body 301, the body connecting portion 316 and the body 301 are connected by means of corresponding elastic snap-fit fasteners 315 and the lugs 317. In this embodiment, four windows 318 and four elastic snap-fit fasteners 315 are evenly provided on the body connecting portion 316 in the circumferential direction, and four lugs 317 are correspondingly provided on the body 301 in the circumferential direction. Those skilled in the art can understand that the body connecting portion 316 may be in snap-fit connection with the body 301 by means of other structures. In this embodiment, the housing 110 is configured such that the interconnected body 301 and connection seat 303 can facilitate a machining process of the housing 110.

Figure 3D:
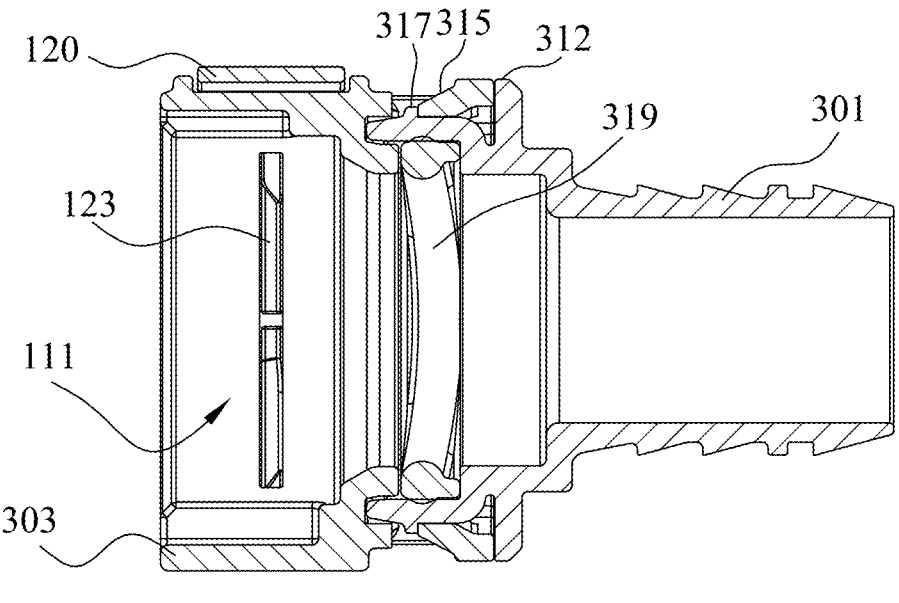
FIG. 3D is a cross-sectional view of the female connector of FIG. 3C along line A-A.

With further reference to FIG. 3D, the female connector 102 further includes a seal ring 319. The seal ring 319 is arranged in the channel 111 of the female connector 102 and connected between the body 301 and the connection seat 303. The seal ring 319 is configured to seal the body 301 and the connection seat 303 to prevent a fluid in the channel 111 from leaking at a connection between the body 301 and the connection seat 303. When the male connector 104 is connected to the female connector 102, the seal ring 319 can also abut against the outer surface of the male connector 104 to prevent the fluid in the channel 111 from leaking between the male connector 104 and the female connector 102. Thus, by arranging one seal ring 319, a sealed fluid channel can be formed within the connector assembly 100. Those skilled in the art can understand that more seal rings can be arranged according to actual needs to achieve a better sealing effect.

Figure 3E:
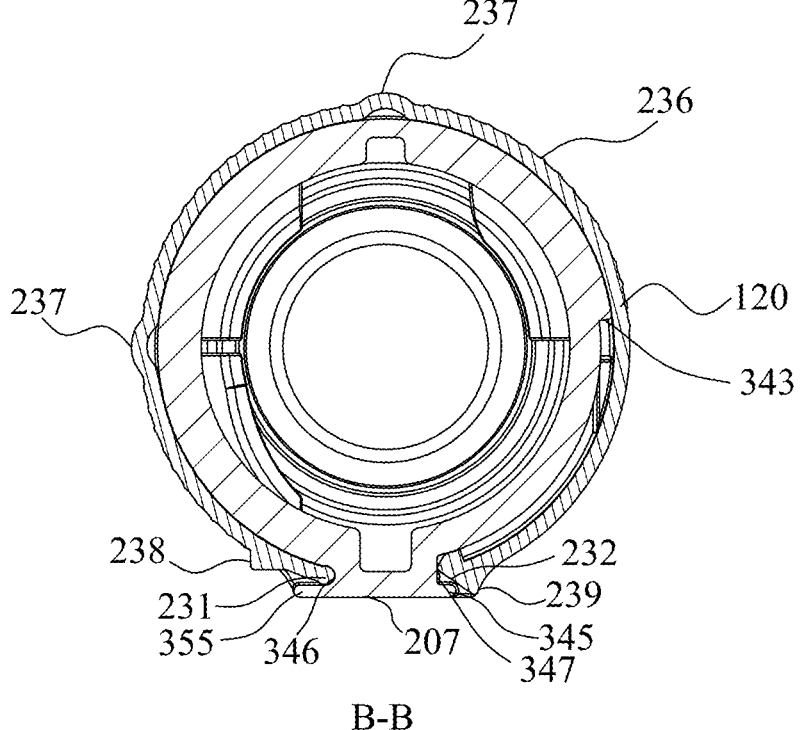
FIG. 3E is a cross-sectional view of the female connector of FIG. 3C along line B-B.

With further reference to FIG. 3E, the mount 207 of the housing 110 extends in a tangential direction, instead of the circumferential direction of the housing 110. The middle of the mount 207 is connected to the housing 110, a groove 346 for accommodating the first end 231 is formed between a left side portion 355 of the mount 207 and the outer surface 209 of the housing 110, and a groove 347 for accommodating the second end 232 is formed between a right side portion 345 of the mount 207 and the outer surface 209 of the housing 110. A front side and a rear side of the mount 207 in the axial direction are connected to a front side wall and a rear side wall of the accommodating groove 352, respectively. Thus, by providing the mount 207 and the accommodating groove 352, the first end 231 and the second end 232 of the retention clip 120 can be accommodated in the groove 346 and the groove 347 when the retention clip 120 is in the initial state, such that the retention clip 120 cannot be moved in the axial direction.

In the various embodiments of the present disclosure, the retention clip 120 is made of a non-metallic material, for example, a plastic material. The retention clip 120 made of the plastic material ensures the strength of the fixed connection between the male connector 104 and the female connector 102, and has a certain elasticity.

Figure 4A:
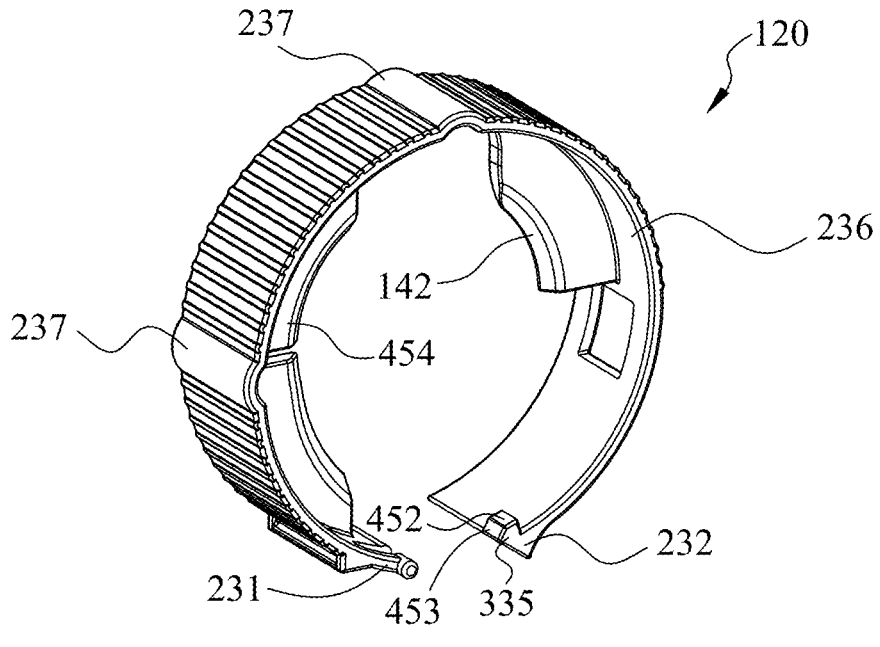
FIG. 4A is a structural perspective view of the retention clip of FIG. 2A.
Figure 4B:
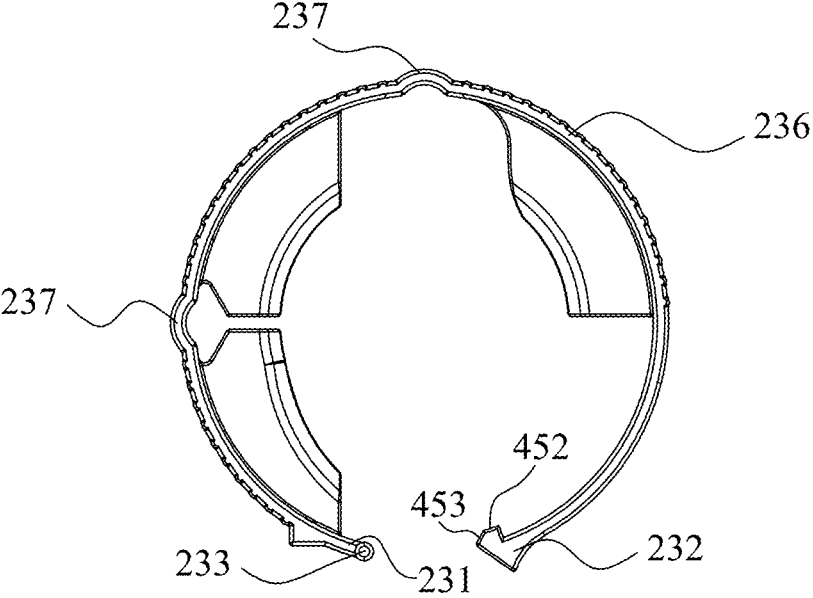
FIG. 4B is a right side view of the retention clip shown in FIG. 4A.
Figure 4C:
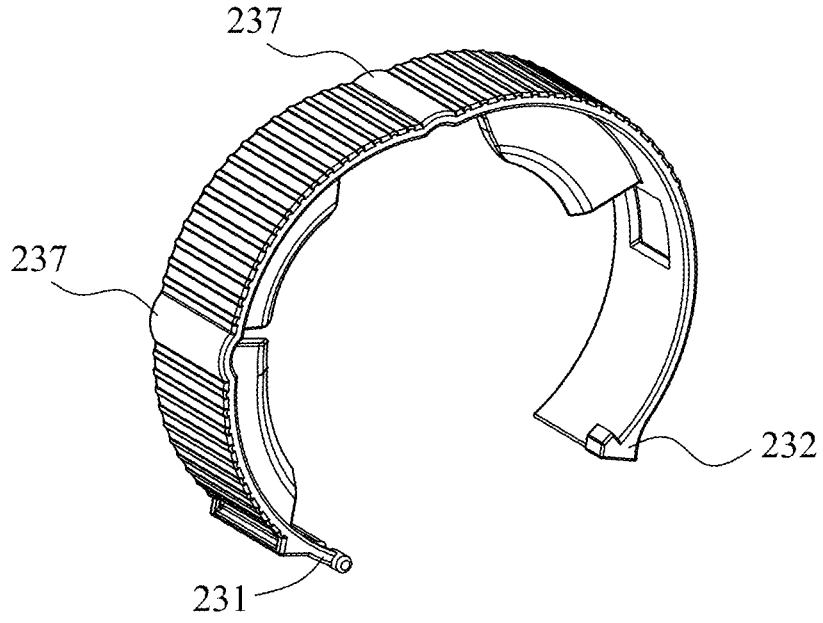
FIG. 4C is a structural perspective view of the retention clip of FIG. 2B.
Figure 4D:
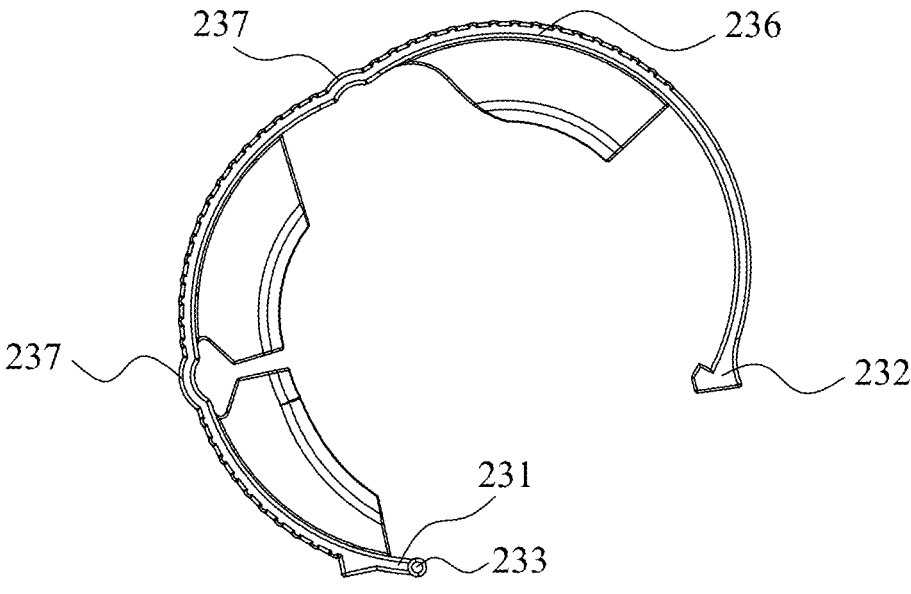
FIG. 4D is a right side view of the retention clip shown in FIG. 4C.

FIGS. 4A-4D show a more specific structure of the retention clip 120. FIGS. 4A and 4B show a structural perspective view and a right side view of the retention clip 120 in the initial state, and FIGS. 4C and 4D show a structural perspective view and a right side view of the retention clip 120 in the deformed state. As shown in FIGS. 4A-4D, the retention flange 123 includes three projections 454, and each projection 454 is provided with an inclined guided portion 142 on an inner side thereof. During insertion of the male connector 104 into the female connector 102, the guiding portion 182 of the male connector 104 can push the three projections 454 outwardly by means of the guided portion 142 to allow the three projections 454 to exit the channel 111, thus making way for the insertion path of the male connector 104. As the three projections 454 move outwardly, the second end 232 of the retention clip 120 moves along the surface of the housing 110, causing the retention clip 120 to be elastically deformed and opened. Also, if the operator pushes the second end 232 directly, the second end 232 can also moves along the surface of the housing 110, causing the retention clip 120 to be opened.

During opening the retention clip 120, the first end 231 rotates about the rotary shaft 233 in an anti-clockwise direction in the figures, such that the two projections 454 connected to the left side of the retention clip 120 are turned outwardly in the anti-clockwise direction. Also, the second end 232 moves upwardly and outwardly in the circumferential direction, such that one projection 454 connected to the right side of the retention clip 120 moves upwardly and outwardly. Thus, the three projections 454 of the retention flange 123 can all exit the channel 111.

By further arching the arch portions 237 outwardly relative to the deformable portion 236, the deformation of the arch portions 237 is facilitated, and during opening the retention clip 120, deformed portions of the retention clip 120 are concentrated mainly on two side edges of the arch portions 237. The rest of the deformable portion 236 is only deformed slightly, so that the deformation force required to deform the entire retention clip 120 is reduced.

In this embodiment, the protrusion 335 on the inner wall of the second end 232 of the retention clip 120 has a surface 452 and a surface 453 that face toward the housing 110, and the surface 452 and the surface 453 are connected to each other at an angle greater than 90°. The second end 232 is configured such that the surface 452 abuts against the outer surface 209 of the housing 110 when the second end 232 is in the locked position. Since the outer surface 209 is in the shape of a circular arc, the surface 452 and the surface 453 at the angle greater than 90° can ensure that the protrusion 335 is always in contact with the outer surface 209 as the second end 232 moves along the outer surface 209 of the housing 110.

FIGS. 5A, 5B, 6A, 6B, 7A and 7B show a mounting process of inserting the male connector 104 into the female connector 102.

Figure 5A:
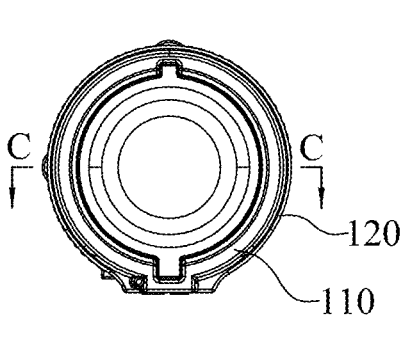
FIG. 5A shows a side view of the connector assembly with the male connector just inserted into the female connector.
Figure 5B:
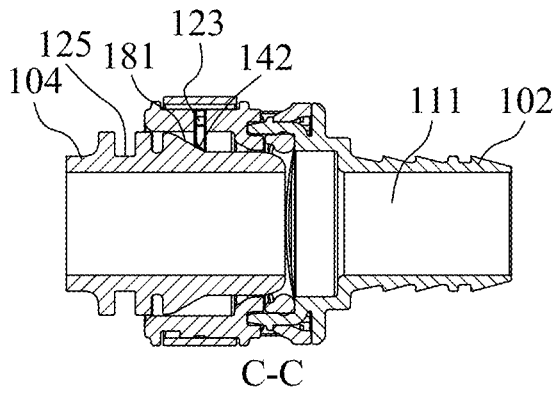
FIG. 5B shows a cross-sectional view of the connector assembly shown in FIG. 5A along line C-C.

FIGS. 5A and 5B show a fit structure of the connector assembly 100 when the male connector 104 is just inserted into the female connector 102. FIG. 5A shows a side view of the connector assembly 100, and FIG. 5B shows an axial cross-sectional view of the connector assembly 100. As shown in FIGS. 5A and 5B, when the male connector 104 is just inserted into the female connector 102, the retention flange 123 of the retention clip 120 projects into the channel 111 through the accommodating portion 213. The retention clip 120 is in the initial state and has not yet been deformed elastically, and the retention clip 120 is sleeved on the outer side of the housing 110 and clamps the housing 110. The second end 232 of the retention clip 120 is in the locked position, and the first end 231 is connected in the shaft hole 251 of the housing 110 by means of the rotary shaft 233. Moreover, the entire identifier in the indication area 221 of the housing 110 is exposed.

The operator inserts the male connector 104 rightward from the left end of the female connector 102 (i.e., backward from the front end of the female connector 102) into the channel 111 of the female connector 102. The male connector 104 performs an axial movement relative to the female connector 102, and a component force is generated to drive the retention flange 123 to move outwardly after the guiding portion 181 of the male connector 104 comes into contact with the guided portion 242 of the retention flange 123. Under the action of the component force, the retention clip 120 is elastically deformed, such that the first end 231 rotates counterclockwise, and the second end 232 moves upwardly and outwardly in the circumferential direction along the outer surface 209 of the housing 110. Moreover, in order to further facilitate the deformation of the retention clip 120 to allow the entire retention flange 123 to exit the channel 111, the operator also needs to push the operating portion 239 on the second end 232 in addition to inserting the male connector 104, to assist in the movement of the second end 232 to the released position, causing the entire retention flange 123 to exit the channel 111. The retention flange 123 of the retention clip 120 moves away from the channel 111, thereby making way for the insertion path of the male connector 104 and allowing the male connector to reach a position as shown in FIGS. 6A and 6B.

Figure 6A:
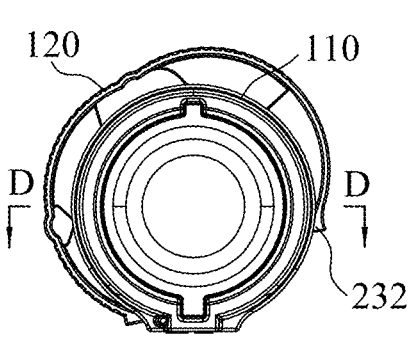
FIG. 6A shows a side view of the connector assembly during insertion of the male connector into the female connector.
Figure 6B:
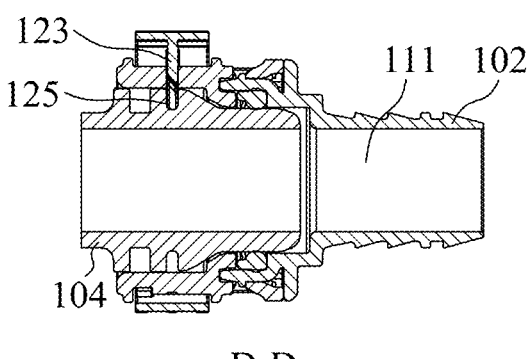
FIG. 6B shows a cross-sectional view of the connector assembly shown in FIG. 6A along line D-D.

FIGS. 6A and 6B show a fit structure of the connector assembly 100 during insertion of the male connector 104 into the female connector 102. FIG. 6A shows a side view of the connector assembly 100, and FIG. 6B shows an axial cross-sectional view of the connector assembly 100. As shown in FIGS. 6A and 6B, the male connector 104 is inserted in place, the retention groove 125 of the male connector 104 is aligned with the retention flange 123, but the retention clip 120 is still elastically deformed under the push by the operator, and the retention flange 123 is still located out of the channel 111. Although the first end 231 of the retention clip 120 performs the rotational movement, the first end is still connected to the housing 110. The second end 232 of the retention clip 120 moves until the protrusion 335 abuts against the stop surface 343, such that the second end 232 cannot continue to slide upwardly in the circumferential direction. At this moment, the retention clip 120 is elastically deformed and has a tendency to return to the initial state. Furthermore, the identifier in the indication area 221 of the housing 110 is at least partially obscured by retention clip 120.

Figure 7A:
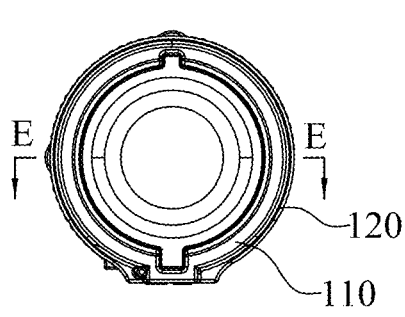
FIG. 7A shows a side view of the connector assembly with the male connector fixedly connected to the female connector.
Figure 7B:
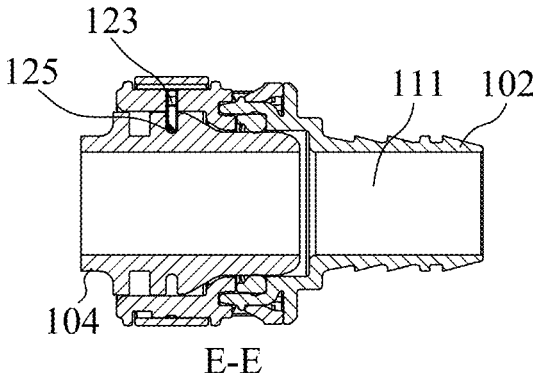
FIG. 7B shows a cross-sectional view of the connector assembly shown in FIG. 7A along line E-E.

After the operator stops pushing the retention clip 120 to remove an external force acting on the retention clip 120, the retention clip 120 returns to the initial state, allowing the connector assembly 100 to reach a position as shown in FIGS. 7A and 7B.

FIGS. 7A and 7B show a fit structure of the connector assembly 100 when the male connector 104 is inserted in place and the male connector 104 is fixedly connected to the female connector 102. FIG. 7A shows a side view of the connector assembly 100, and FIG. 7B shows an axial cross-sectional view of the connector assembly 100. As shown in FIGS. 7A and 7B, the male connector 104 and the female connector 102 are mounted in place, and the retention groove 125 of the male connector 104 is aligned with the retention flange 123 of the retention clip 120. The retention clip 120 returns to the initial state, and the second end 232 moves downwardly from the released position to the locked position along the outer surface of the housing 110. The retention clip 120 clamps the housing 110 again. Also, the retention flange 123 of the retention clip 120 enters the retention groove 125 of the male connector 104 to clamp the male connector 104 and prevent the male connector 104 from continuing moving in the axial direction, so that the male connector 104 and the female connector 102 are fixedly connected. At this moment, as the retention clip 120 returns to the initial state, the entire identifier in the indication area 221 of the housing 110 is exposed again.

Thus, the operator can determine whether the male connector 104 is inserted in place by confirming whether the entire identifier in the indication area 221 is exposed.

When it is required to dismount the mounted connector assembly, the connector assembly can be dismounted according to a sequence as shown in FIGS. 7A-7B, 6A-6B, and 5A-5B. Specifically, the operator first pushes the second end 232 of the retention clip 120 to the released position, such that the retention clip 120 is elastically deformed, the retention flange 123 of the retention clip 120 exits the retention groove 125 of the male connector 104, and then the male connector 104 can be withdrawn from the female connector 102.

Some connector assemblies, particularly a VDA standard connector assembly having standard dimensions, typically includes snap rings for locking and releasing male connectors. Since the retention groove of the male connector requires a large groove depth, the snap ring fitting with the retention groove needs to have a large travel. If the entire snap ring is pushed out of the channel by the male connector, a larger axial travel is required during insertion of the male connector into the female connector, and the axial length of the connector assembly will be larger accordingly. If the operator is relied on to pull the entire snap ring out of the channel, the snap ring is easily detached when the operator applies an excess force. When the connector assembly is used in a pipe of a vehicle, it is difficult to find the detached snap ring due to the limited space and visibility inside the vehicle.

The female connector of the present disclosure includes the housing and the retention clip, and the male connector is locked and released by the retention clip. Since the fixed portion of the retention clip is connected to the housing, the retention clip would be not detached from the housing even when the operator applies a large force. Also, the movable portion of the retention clip is movable in a circumferential direction of the housing such that the retention clip is elastically deformed. The elastic deformation of the retention clip allows the retention flange arranged on the inner wall of the retention clip to be out of the movement path of the male connector, so as to facilitate inserting the male connector into the female connector or pulling the male connector out of the female connector. The operator can force the movable portion to move by applying a pushing force to the second end and thus facilitate the deformation of the retention clip. Therefore, the retention flange no longer relies completely on the push of the male connector to exit the channel, so that the axial length of the connector assembly can be set to be smaller.

Moreover, the retention clip of the female connector of the present disclosure is made of a plastic material which is easier to elastically deform, and compared with the metal snap ring, the retention clip requires a smaller deformation force when deformed, so the operator can manually push the second end to move. The retention clip of the present disclosure is structurally configured in the shape of a thinner circular ring to reduce the deformation force of the retention clip, and the strength of the retention clip is ensured by setting a larger thickness. Furthermore, the retention clip of the present disclosure is provided with the arch portions to further reduce the deformation force of the retention clip.

In addition, with regard to the connector assembly of the present disclosure, it is possible to indicate whether the male connector is inserted into the female connector in place according to the state of the retention clip, an exposure range of the identifier, or the sensation of pressing the operating portion. In some embodiments, the operator may determine the position of the male connector relative to the female connector directly by confirming whether the retention clip abuts against the housing with visually observing or pressing the retention clip. In some embodiments, the identifier is a two-dimensional code, and the operator can scan the two-dimensional code to determine whether the entire identifier is exposed.

While the present method and/or system has been described with reference to certain implementations, it will be understood by those skilled in the art that various changes may be made, and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A connector assembly, comprising:
a male connector, the male connector comprising a retention groove recessed inwardly and extending in a circumferential direction; and
a female connector, comprising:
a housing, the housing being cylindrical and defining a channel extending in an axial direction therein, and the housing being configured to be capable of receiving and being fixedly connected to the male connector inserted in the axial direction of the housing via the channel, wherein the housing is provided with at least one accommodating portion circumferentially arranged in a housing portion receiving the male connector; and
a retention clip, the retention clip being sleeved on an outer side of the housing, at least one retention flange being provided on an inner wall of the retention clip, and the at least one retention flange fitting with the at least one accommodating portion and at least partially projecting into the channel through the accommodating portion to insert into the retention groove of the male connector, wherein the retention clip has a fixed portion and a movable portion, the fixed portion being connected to the housing, and the movable portion being movable between a locked position and a released position along a surface of the housing,
wherein the retention clip is configured such that the at least one retention flange is capable of projecting into the channel and being located in a travel path of the male connector when the movable portion is in the locked position; and
the at least one retention flange exits the channel and is out of the travel path of the male connector when the movable portion is in the released position,
wherein the male connector is inserted into the female connector in the axial direction of the housing, and the at least one retention flange projects into the retention groove of the male connector, such that the male connector and the female connector are connected fixedly relative to each other.

2. The connector assembly according to claim 1, wherein the retention clip is in the shape of a circular ring having an opening, and the retention clip has a first end and a second end formed at the opening; and
the first end forms the fixed portion and the second end forms the movable portion.

3. The connector assembly according to claim 2, wherein the first end is rotatably connected to the housing, and the first end rotates relative to the housing when the second end moves from the locked position to the released position, wherein a rotation axis of the first end is parallel to an axis of the housing.

4. The connector assembly according to claim 2, wherein a slide groove extending in a circumferential direction is provided in the surface of the housing, a protrusion is provided on an inner wall of the second end, and the protrusion fits with the slide groove to limit a trajectory of the second end moving along the surface of the housing.

5. The connector assembly according to claim 4, wherein the slide groove has a stop surface at a tail end thereof, the stop surface being configured to restrict the protrusion to the released position.

6. The connector assembly according to claim 2, wherein the retention clip further comprises a deformable portion, and the first end and the second end are respectively connected to two ends of the deformable portion, and wherein the deformable portion is configured to be deformable in order to at least partially leave from an outer surface of the housing as the second end moves from the locked position to the released position.

7. The connector assembly according to claim 6, wherein the deformable portion comprises at least one arch portion arching outwardly, and the at least one arch portion is configured to deform more easily than the rest of the deformable portion, to assist in the movement of the second end from the locked position to the released position.

8. The connector assembly according to claim 2, wherein the housing comprises a mount, the mount extending in a tangential direction of the housing; and
wherein the first end and the second end of the retention clip are respectively disposed on two opposite sides of the mount in a circumferential direction.

9. The connector assembly according to claim 2, wherein the housing comprises an indication area on its outer surface, the indication area being configured to arrange an identifier; and
wherein the identifier in the indication area is exposed when the second end of the retention clip is in the locked position, and the identifier in the indication area is at least partially obscured by the retention clip when the second end is not in the locked position.

10. The connector assembly according to claim 2, wherein at least one operating portion is provided on an outer wall of the second end, the operating portion protruding from the outer wall of the second end to facilitate applying a pushing force to the operating portion by an operator for pushing the second end to move along the surface of the housing.

11. The connector assembly according to claim 2, wherein the housing has a shaft hole;
the first end is provided with a rotary shaft, and the first end is rotatably connected to the housing by the rotary shaft; and
wherein an assembling portion is provided on an outer wall of the first end, and the assembling portion is configured to cooperate with an assembling tool to push the rotary shaft into the shaft hole.

12. The connector assembly according to claim 1, wherein the retention clip is made of a plastic material.

13. The connector assembly according to claim 1, wherein the at least one retention flange comprises a plurality of retention flanges.

14. A female connector for receiving and being fixedly connected to a male connector having a retention groove, comprising:

a housing, the housing being cylindrical and defining a channel extending in an axial direction therein, and the housing being configured to be capable of receiving and being fixedly connected to the male connector inserted in the axial direction of the housing via the channel, wherein the housing is provided with at least one accommodating portion circumferentially arranged in a housing portion receiving the male connector; and a retention clip, the retention clip being sleeved on an outer side of the housing, a plurality of retention flanges being provided on an inner wall of the retention clip, and plurality of retention flanges fitting with the at least one accommodating portion and at least partially projecting into the channel through the accommodating portion to insert into the retention groove of the male connector, wherein the retention clip has a fixed portion and a movable portion, the fixed portion being connected to the housing, and the movable portion being movable between a locked position and a released position along a surface of the housing, wherein the retention clip is configured such that
the plurality of retention flanges are capable of projecting into the channel and being located in a travel path of the male connector when the movable portion is in the locked position; and
the plurality of retention flanges exit the channel and are out of the travel path of the male connector when the movable portion is in the released position.

15. The female connector according to claim 14, wherein:
the retention clip is in the shape of a circular ring having an opening, and the retention clip has a first end and a second end formed at the opening; and
the first end forms the fixed portion and the second end forms the movable portion.

16. The female connector according to claim 14, wherein the first end is rotatably connected to the housing, and the first end rotates relative to the housing when the second end moves from the locked position to the released position, wherein a rotation axis of the first end is parallel to an axis of the housing.

17. The female connector according to claim 14, wherein the retention clip further comprises a deformable portion, and the first end and the second end are respectively connected to two ends of the deformable portion, and wherein the deformable portion is configured to be deformable in order to at least partially leave from an outer surface of the housing as the second end moves from the locked position to the released position.

18. A female connector for receiving and being fixedly connected to a male connector having a retention groove, comprising:

a housing, the housing being cylindrical and defining a channel extending in an axial direction therein, and the housing being configured to be capable of receiving and being fixedly connected to the male connector inserted in the axial direction of the housing via the channel, wherein the housing is provided with at least one accommodating portion circumferentially arranged in a housing portion receiving the male connector; and a retention clip, the retention clip being sleeved on an outer side of the housing, at least one retention flange being provided on an inner wall of the retention clip, and at least one retention flange fitting with the at least one accommodating portion and at least partially projecting into the channel through the accommodating portion to insert into the retention groove of the male connector, wherein the retention clip has a fixed portion and a movable portion, the fixed portion being connected to the housing, and the movable portion being movable between a locked position and a released position along a surface of the housing, wherein the retention clip is configured such that the at least one retention flange is capable of projecting into the channel and being located in a travel path of the male connector when the movable portion is in the locked position, wherein the at least one retention flange exits the channel and is out of the travel path of the male connector when the movable portion is in the released position, wherein the retention clip is in the shape of a circular ring having an opening, and the retention clip has a first end and a second end formed at the opening, wherein the first end forms the fixed portion and the second end forms the movable portion, and wherein a slide groove extending in a circumferential direction is provided in the surface of the housing, a protrusion is provided on an inner wall of the second end, and the protrusion fits with the slide groove to limit a trajectory of the second end moving along the surface of the housing.

19. The female connector according to claim 18, wherein the slide groove has a stop surface at a tail end thereof, the stop surface being configured to restrict the protrusion to the released position.

* * * * *